Figure 1:
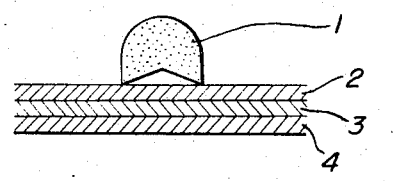

(a)   (b)

Fig. 13
Fig. 14
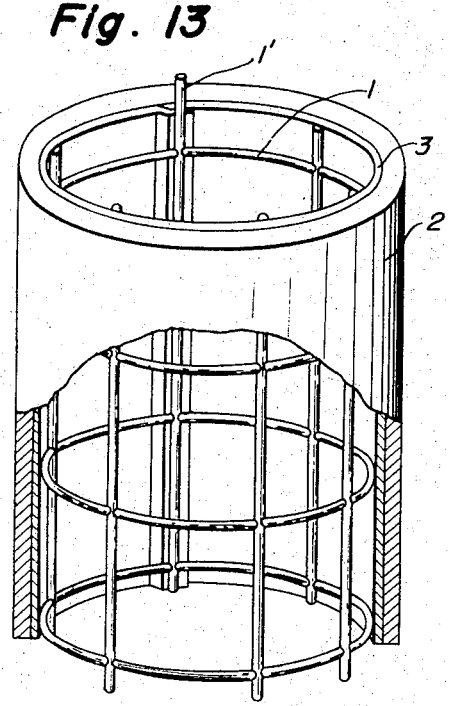
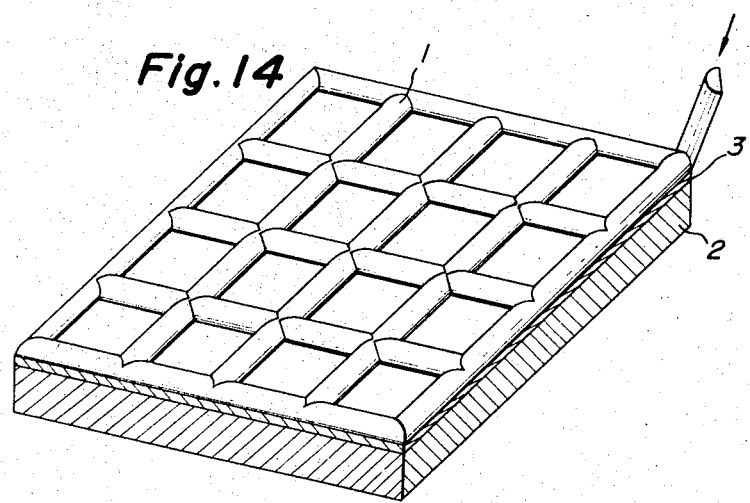

United States Patent Office 3,344,510
Patented Oct. 3, 1967

3,344,510
LINE WELDING METHOD FOR METALS
BY EXPLOSIVES
Masayuki Kameishi, Ryuichiro Higuchi, and Tooru Niwatsukino, Nobeoka-shi, Japan, assignors to Asahi Kasei Kogyo Kabushiki Kaisha, Osaka, Japan, a corporation of Japan
Filed Feb. 19, 1964, Ser. No. 346,019
Claims priority, application Japan, Feb. 21, 1963, 38/11,028; Mar. 29, 1963, 38/14,114; Aug. 7, 1963, 38/57,648; Sept. 12, 1963, 38/48,068; Sept. 18, 1963, 38/67,999
11 Claims. (Cl. 29—470.1)

This invention relates to a method of line welding a plurality of metal plates of the same or different material by utilizing shock pressure caused by the detonation of explosives, and is characterized by producing an efficient welding method while eliminating various disadvantages found in conventional welding methods.

In the gas-, arc- or electric resistance-welding practiced in the prior art as a method of welding a plurality of metallic plates, the kinds and thicknesses of the metallic plates which can be used are limited. For example, in the case of welding an anticorrosive metal, such as stainless steel, to a soft steel plate by the electric resistance-welding method, certain disadvantages are encountered with stainless steel of thickness less than 2 mm., causing diffusion and reduction of anticorrosive properties.

Furthermore, while it is possible in principle to weld copper, aluminium or titanium plate to a soft steel plate by prior art methods, it is very difficult and necessitates a high degree of skill, thus having the disadvantage that the quality of welding is widely varied and depends also upon the nature and thickness of the material.

Such a prior art method is the so-called fusion welding method. Since it melts the welding portion of metals in wide range, a change in the metallographic structure, and the formation of an alloy layer is frequently unavoidable thus having the disadvantage that chemical and mechanical properties of the metal are weakened.

The friction welding methods of recent years known as the cold welding method require complex equipment. The ultra-sonic wave welding method also requires large sized equipment. Both of these methods make welding work on large-sized material difficult.

A method of manufacturing clad steel plate (clad metal) has also been developed in recent years by means of welding by explosives, whereby even a combination of metallic plates each having a low weldability can be welded. This requires a large quantity of explosive to be used since welding is carried out over the entire plates, thus the operating area is extremely restricted in view of explosive sound and safety. Further, because of the fact that an exact gap and angle should be provided between both plates, a supporter should therefore be used, and a complex structure would be extremely difficult to weld.

It is the object of the present invention to substantially reduce many of the disadvantages found in previous welding methods, and to provide a method of welding metallic plates in the line form by utilizing a comparatively small amount of explosives.

One object of this invention is to provide a method of welding in line form a combined plurality of the same or different kinds of overlapped metallic plates by the shock pressure of detonation.

Another object of this invention is to provide a method of firmly welding metallic materials of relatively poor welding properties by the above-mentioned welding method.

Still another object of this invention is to provide a method to substantially reduce the occurrence of shock-ing indentation by the detonation front of explosive on the surfaces of the metallic plates to be welded.

Still another object of this invention is to provide an explosive of efficient shape and a cover thereof.

Still another object of this invention is to provide an effective composition of explosive in the welding method mentioned above.

Figure 2:
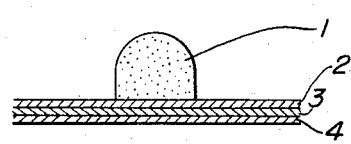
Figure 3:
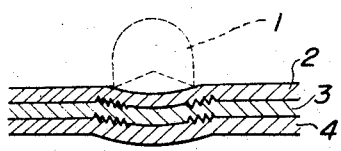
Figure 4:
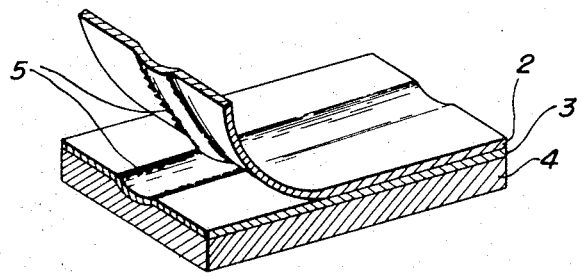

The invention is now described in detail referring to the accompanying drawing:

FIGURES 1 and 2 are sectional illustrations showing a means of carrying out the explosive welding method of the present invention; FIGURES 3 and 4 illustrate the state of metallic plates after performing the method of this invention; FIGURES 5, 6, 7 and 8 are sectional shapes of explosives used for the explosive welding method of this invention; and FIGURES 9, 10, 11, 12, 13 and 14 show various embodiments suitable for industrial applications of the explosive welding method of this invention.

Referring to FIGURE 1 explosive 1 having a depressed bottom surface is used in the case where the total thickness of the metallic plates 2 and 3 which are hereinafter said to be layer plates and which overlap a metallic plate 4 which is hereinafter referred to as a base plate, is comparatively thick, or when the layer metal has a low ductility. FIGURE 2 shows explosive 1 with a plane bottom surface in the event that the total thickness of the plurality of layer plates 2 and 3 which overlap the base plate 4 is comparatively thin, or when that respective layer plate has a high ductility. FIGURE 3 illustrates a metallic plate after welding by the method shown in FIGURE 1, wherein layer plates 2 and 3 and base plate 4 are depressed. The elastic waves at the boundary surface of the respective metal plates on both sides of the bottom of the explosive, are shown in the figure by zigzag lines. FIGURE 4 illustrates the condition when one of the layer metals is partially removed after welding, wherein the respective metal plate has a concavity showing that the plates were welded in the form of parallel lines having the width shown at 5 in FIGURE 4.

If the surface of respective metallic plate is contaminated with an anti-corrosive film, a layer of oxide, oil and fat, dust and/or other dirt, it is necessary to chemically cleanse the plates with acid, alkali and/or volatile organic solvent, or mechanically with emery paper, grinder and/or grit blast, otherwise the metallic plates will be intermittently welded or will not be welded at all. Needless to say, when the metal surface is clean, it is not necessary to carry out the treatment mentioned above.

In the explosive welding of the present invention, when the layer metal(s) is 2.0 mm. or more thick, or has low ductility such as found in stainless steel or titanium of 1.5 mm. or more thick, it is more effective for improving the welded strength to form a depressed portion having a width equal to, or up to twice as large as that of the bottom of the explosive, in the welding surface of the base metal. This depression may be made by means of chemical treatment such as etching or by mechanical treatment such as grinding or grid blasting. Although the degree of depression would not necessarily be exact as to the kind and the thickness of the plates, the optimum depth is 0.1–1.0 mm. Generally speaking the thicker the plates and the lower the ductility of the metals, the greater the depression required.

As mentioned above, it is not neecssary to provide a gap by forcible means using a supporter or the like. The welding of even a complex structure can be carried out, because the layer metal(s) may sufficiently overlap onto the base metal.

Furthermore, in the present invention, the welding quality is largely governed by the shape of the explosive bottom facing the layer metal. That is, when the total thickness of all layer metals is comparatively small such as less than 2 mm. as mentioned above, or the layer metals have high ductility, an explosive bottom having a plane surface is adequate. When the total thickness of all layer metals is comparatively large such as over 2 mm., or the layer metals have low ductilities, it is preferable to have depressions in the explosive bottom, since the welding strength is increased if the shock pressure is locally concentrated. The shape of the depression in an arc form shown by a in FIGURE 5, or an angle form shown by b in FIGURE 5 has been found to be effective. In an explosive forming arc at the depressed portion shown by a of FIGURE 5, it is preferable that the maximum depth h of the depression be less than ½ of the height H of the explosive for welding thick layer metals having rather high ductilities such as arms bronze (A.M.B.) or the like. Furthermore, in the angled explosive shown by b in FIGURE 5, it is preferable that the angle θ ranges from 90° to 180° and that the maximum depth of the depression be less than ½ of the height H of the explosive. This is preferable for the welding of layer metals having low ductility such as titanium and stainless steel or the like. When the width d of the depression in either case is not more than ½ of the width D of the explosive bottom, the effect of a depression is slight.

In the explosive welding of the present invention, an explosive cord is used. Even when work on a small sectional area is carried out such an explosive composition is required which may be detonated with a detonator. To effectively perform the explosive welding on plane plates, curved plates, pipe and other such structures, the explosive must have adequate flexibility and must be easily deformable to the shape of the material to be welded, and must be capable of maintaining the deformed shape during operation.

The most suitable explosive composition meeting the above-mentioned requirements is an explosive compound consisting of pentaerithritol tetranitrate (briefly called PETN hereinafter), hexogen, and tetryl which is highly sensitive to a detonator as the basic agent. The binding agents, softening and stick agents are also added. The softening agent as herein referred to is a material which will give good workability. Softening agents include the following:

Vegetable oil group:
   Pine tar
   Pine oil
   Colophony
Fatty oil group: Stearlic acid
Mineral oil group:
   Process oil
   Mineral rubber
   Petrolatum
   Coal tar
Synthetic materials:
   Cumarone resin
   Phenol resin
   Styrene resin and
   Other synthetic resins having low softening temperatures.

By stick agent is meant a material which is used to obtain a good inclusive property and give forming and workable properties to the explosive compound. These include ester gum, colophony, terpene resin, phenol resin and the like.

Although the quantity of softening agent mixed into a binding agent may well be in a range sufficient to give flexibility, practical considerations fix the amount within the range from 0.5 to 2 parts of the softening agent to 1 part of paraffin. A stick agent may be suitably added to obtain better mixing property with the explosive, however, it is sufficient to add less than 0.5 part of stick agent to 1 part of total quantity of binding agent and softening agent.

The quantity of these additives to be mixed into the explosive is sufficient if constituting 15–45% of the total quantity after mixing. Therefore, the greater the quantity of additives the more the explosiveness is reduced and the lesser the quantity of the additives the more the flexibility and the forming property is reduced.

In the manufacture of an explosive, a binding agent, a softening agent and a stick agent are preferably melted, mixed and cooled down to a safe temperature, then the explosive is added thereto. However, the order of mixing is not important.

Thus the gluey explosive mix may be worked into an explosive cord of desirable shape.

With an explosive compound of the aforementioned composition, the welding of layer metals such as aluminium or the like having comparatively low hardness and high ductility causes a deep indentation, a considerable reduction of plate thickness at the welded portion and undesirable utility and appearance. The welding of such layer metals will be more effectively performed and satisfactory results will be obtained, if a reduction of explosive strength is made with an insensitizer. An inorganic nitrate such as potassium nitrate, barium nitrate or the like is employed as the insensitizer. Satisfactory results are obtained when 40% or less of explosive is replaced with the insensitizer.

The explosive cord, which is made by forming the above mentioned welding explosive compound in cord form, can be detonated by a No. 6 detonator or a detonating fuse from one end.

In performing the explosive welding method of the present invention, the coverless explosive cord is capable of welding the layer metals, but in the event that the layer plates have comparatively low hardness or the quality of the material is subject to change on heating, a coverless explosive may not be employed. Because of the high pressure of the hot gas caused by detonation of the explosive on the surface of the layer metal, traceable damage is made on its surface, and in the structure of the surface layers of the layer plates. In addition, the explosive has the disadvantage that it sticks to the hands of the worker and to various articles, and is apt to cause damage in handling. To prevent these disadvantages, the explosive is coated with covering materials such as natural or synthetic rubber, synthetic resin or copolymer. These covering materials avoid the sticking effect in handling and furnish the effect of a buffer when the explosive detonates. It is desirable that natural and synthetic rubber which has 40–95 of JIS (Japanese Industrial Standard) hardness be used. Synthetic resins which are flexible, such as soft polyvinyl chloride including a suitable amount of plasticizer or copolymer are suitable. Another suitable material is nitrile rubber consisting of rubber and synthetic resin.

The shape of the bottom surface of the explosive after it has been covered determines the detonating pressure in the bottom direction, as well as the distribution of pressure and the buffer effect to a considerable degree in relation to the shape of the bare explosive.

Figure 5:
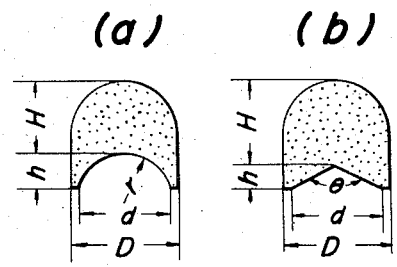
Figure 6:
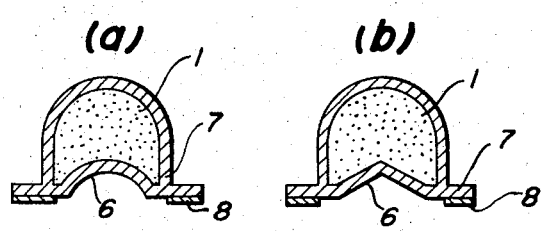
Figure 7:
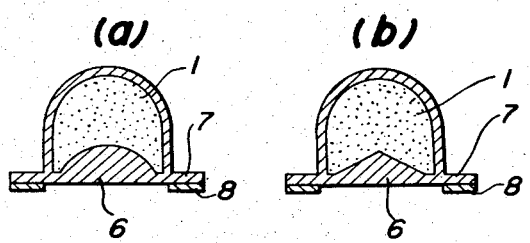

FIGURES 6 and 7 show an explosive after the bare explosive shown by a and b of FIGURE 5 is covered.

In FIGURE 6, an explosive having a depressed bottom is covered with a covering material 6 along the bottom, as shown by a and b of FIGURE 6. The buffer effect is small, but the shock pressure is high and apt to concentrate immediately below the central axis of the explosive. On the other hand, when an explosive having a bottom with a depression is covered so as to form a plane bottom with covering materials as shown by a and b of FIGURE 7, the buffer effect is large and the concentrated character of the shock pressure is weakened and dispersed.

Figure 8:
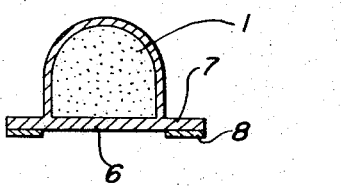

In the case of an explosive having a plane bottom, and covered as shown in FIGURE 8, the shock pressure is evenly distributed to the portion facing the bottom of the explosive.

As shown in FIGURES 6, 7 and 8, if the attachment area is widened by attaching a "fin" 7 made of the same material as the covering material of the explosive, and an adhesive material or double-faced adhesive tape 8 is provided at the bottom of the "fin," the pressure welding operation can be more effectively performed because the explosive can be formed in a desirable shape and secured firmly to the surface. It is not desirable that an adhesive material be provided directly below the entire bottom of the covered explosive, because when that adhesive material has irregular thickness this produces undesirable traces.

Referring now to FIGURES 9, 10, 11, 12, 13 and 14, fundamental examples of the industrial applications of this invention are given.

Figure 9:
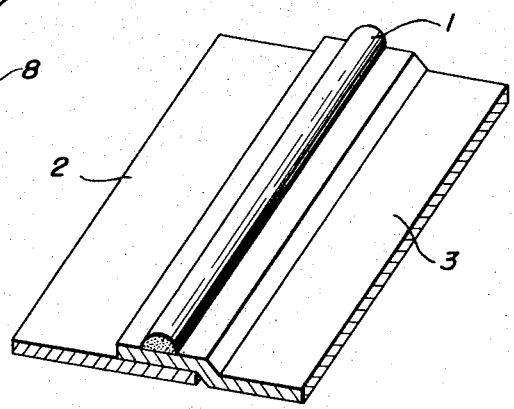

FIGURE 9 shows a method of welding metal plates in straight linear form. In FIGURE 9, 1 is the explosive cord set in a straight linear form on the metallic plates to be welded, and 2 and 3 are two metallic plates. One metallic plate 3 is overlapped partly over the metallic plate 2.

Figure 10:
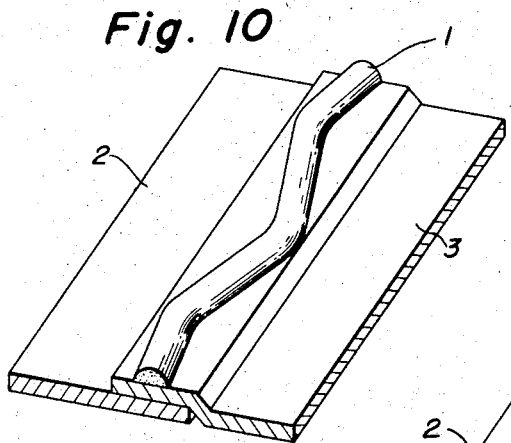

FIGURE 10 is similar to FIGURE 9 and shows a method of welding the metallic plates in zigzag form. In FIGURE 10, 1 is an explosive cord set in zigzag form on the metallic plates to be welded, and 2, 3 are two metallic plates. Metallic plate 3 is overlapped partly over metallic plate 2. It is preferable that zigzag welding be used to weld parts of metallic plates which are subject to mechanical action, for the zigzag weld increases the mechanical strength of welded parts.

Figure 11:
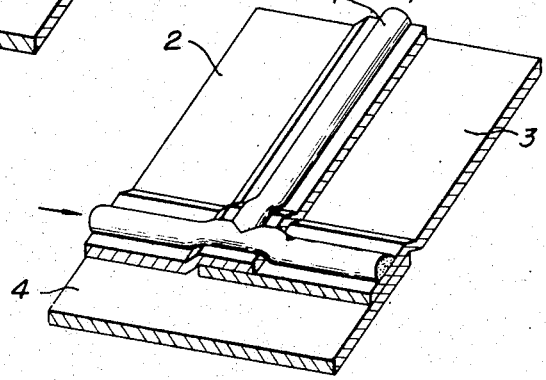

FIGURE 11 shows the lap welding of three metallic plates. In FIGURE 11, 1 is an explosive cord and 2, 3 and 4 are metallic plates to be welded. That is, metallic plate 2 is overlapped partly on the metallic plate 3, and further, metallic plates 2 and 3 are overlapped partly on the metallic plate 4. The explosive 1 is applied on the overlapped part of metallic plates 2, 3 and 4. Then, it may be initiated with a detonator. But, when the explosive is initiated, it must be initiated at either end of the explosives 1 (shown by arrows in the figure) which are applied on the uppermost metallic plate 2. When the explosive is initiated at any other end of the explosive (not indicated in the figure) which is set-up immediately on the metallic plate 3, the lap joint portion of the metallic plates 2 and 3 will be damaged, because the cut-end surface of metallic plate 2 is impacted by the shock front produced by detonation of the explosive.

Figure 12:
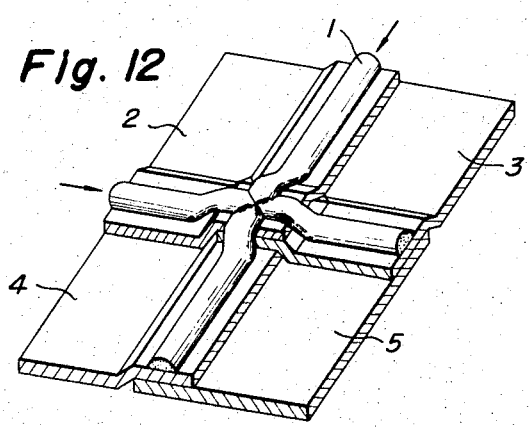

FIGURE 12 shows lap welding of four metallic plates. As shown in this figure, four metallic plates 2, 3, 4 and 5 are partly overlapped and the explosive 1 is applied on the overlapped portion of these metallic plates.

The explosion may be initiated at the positions shown by arrows in FIGURE 12.

FIGURE 13 shows a means of lining a cylinder. In this figure, 1 and 1' illustrate explosives suitable for welding. 2 is a cylindrical base plate and 3 is a layer plate to be lined onto the base metal 2. The explosive 1 is applied on the layer metal 3 in loop form and the explosive 1' is applied on the layer metal 3 in straight linear form in the axial direction of the cylinder. Initiation with a detonator may be performed at one end of the linear explosive 1, layer plate 3 being instantaneously welded on cylindrical base metal 2 in lattice form. Thus, the lining of the cylinder can be easily obtained with explosives.

FIGURE 14 shows an example of clad welding with explosive cord. In this figure, 1 illustrates the explosive which is applied in lattice form so as to intersect at right angles on the layer metal 3 overlapped on the base metal 2. Initiation with a detonator may be performed at the position shown by the arrow. In this case it is not always necessary to define the position to be initiated. After initiation, metallic plates 2 and 3 are welded at the boundary surface corresponding to the position where the explosive was applied. Thus, a clad plate welded in lattice form can be obtained. This method has an advantage that a more desirable welding strength may be obtained, because it is possible that by setting explosives on the metallic plate to be welded in any form, such as parallel, projectile, zigzag or lattice, the area of welding is varied.

In the above-mentioned example, by arranging an explosive cord in an endless form such as a circle or projected parallel as shown in FIGURES 13 and 14, linear damage marks, which vary in strength with the width of the explosive cord are at right angles to the axis of said explosive. These are caused on the surface of layer metals having a low hardness and high ductility such as copper or aluminium by the shock interference of the detonation front at one or more places during the detonation process of said explosive. Since an explosive cord transmits detonation in various directions at almost equal velocity, it being possible to predict the position of impact of the detonation front. To prevent the damage marks mentioned above, a metal sheet is interposed at the portion between a layer plate metal and the explosive where shock interference of the detonation front occurs. It is then necessary that an intermediate material such as paper or synthetic resin be further interposed between the layer metal and the metal sheet or that a film of mineral or vegetable oil be placed on the surface adjacent to the layer metal or the metal sheet to prevent welding of the metal sheet to the layer metals. A metal sheet having a comparatively high hardness, a thickness of 0.3–1.0 mm. and the same or greater width as that of the explosive may be employed.

*Example 1*

Two 500 mm. x 50 mm. x 1 mm. aluminium plates were overlapped on their whole surfaces after being de-oiled with benzene on the expected welding surfaces, and placed on a concrete base 200 mm. thick.

An explosive cord having a square section of 3 mm. x 3 mm., which consists of 60% of PETN, 17% of paraffin, 14% of petrolatum grease and 9% of ester gum was set up at the center of above-mentioned overlapped aluminium plates along the longitudinal direction. The two metallic plates were welded at their center in linear form after detonating the explosive with No. 6 electric detonator from one end thereof.

*Example 2*

250 mm. x 250 mm. x 9 mm. of a soft steel plate (JIS. SS–41) was used as a base metal and a titanium plate (JIS. ST–40) was used as a layer metal.

The surface to be welded was cleaned with a grinder (#100) for the soft steel plate and with emery paper (E120) for titanium plate.

Both metallic plates were placed on the ground with their surfaces overlapping each other and explosive cord consisting of 70% of hexogen, 13% of paraffin, 12.5% of petrolatum grease and 4.5% of ester gum, and having a length of 600 mm. by 6 mm. in height by 7 mm. in width was set up in zigzag manner on the center of the upper surface of the layer metals. As shown at $a$ in FIGURE 5 the cord had a 15 mm. radius $r$ and was 2.5 mm. in height $h$. The explosive was detonated at one end, and the above-mentioned metallic plates were welded in the shape corresponding to the shape in which the explosive was set up.

*Example 3*

As shown in FIGURE 9, four 200 mm. x 200 mm. x 1 mm. titanium (JIS. ST–60) plates were deoiled on the welding surfaces, and were overlapped at their respective opposite edges over a width of 20 mm. so that the four plates formed crossed lap joints. The plates were placed on a soft steel plate of 20 mm. in thickness having a film of liquid paraffin.

An explosive cord having the same composition as the explosive described in Example 1, and formed so as to include a 120° angle at the bottom with a 2 mm. height $h$ as shown at $b$ in FIGURE 5, 6 mm. in height and 8 mm. in width were set up over the above-mentioned overlapped portion of the metallic plates so as to orthogonally cross each other. When the explosives were detonated with No. 6 electric detonator from one end of an explosive set up over the upper most titanium plate, the four titanium plates were completely lap welded to each other.

*Example 4*

A cylindrical pipe made of a soft steel plate (JIS. SS–41) of inner diameter of 550 mm., 500 mm. in length and 9 mm. in thickness was used as a base plate. A layer plate of stainless steel of 1 mm. in thickness (JIS, SUS–27) formed so as to be able to closely contact the inner surface of the cylindrical pipe of the base plate, was set up inside the base metal. The surface treatment of the weld surface was performed with a grinder (#100) for the base plate metal and with emery paper (E120) for the layer plate.

The explosive used for welding was an explosive similar to that of Example 3. A total of six explosive cords were disposed circumferentially on layer metal inside cylindrical pipe in parallel with each other at a distance of 100 mm.

Twelve straight explosive cords of approximately the same length as the cylindrical pipe were disposed relative to the cylindrical pipe so as to be parallel and at equal distance to each other. One cord was adjusted so as to be disposed on the duplicating portion of the stainless steel.

By detonation at one end of the explosives disposed on the overlapped portion of the steel plate with No. 6 electric detonator, the base plate and the layer plate were welded at the portion where the explosive was set up.

*Example 5*

A soft steel plate of 1000 mm. x 2000 mm. x 12 mm. (JIS, SS–41) was used as a base plate, and a copper plate of 1000 mm. x 2000 mm. x 2 mm. (JIS, CUP2–0) as a layer plate. The welding surface was cleansed with a grinder (#100) for the soft steel plate and with an emery paper (E120) for the copper plate, and both metal plates were overlapped on their whole surfaces and placed on the ground.

An explosive cord having same composition as mentioned in Example 1 and a square section of 9 mm. x 9 mm. was employed.

As shown in FIGURE 14, eleven explosives longitudinally and twenty-one explosives axially were set up orthogonally in parallel sets at a distance of 100 mm. on the layer metal. An explosive similar to the above mentioned explosive of 10 mm. in length was connected with one end of the explosive at the corner, and was detonated with a No. 6 electric detonator. As a result, the two metallic plates were welded to each other.

*Example 6*

A soft steel plate of 50 mm. x 500 mm. x 12 mm. (JIS, SS–41) was used as a base plate, and a titanium plate of 50 mm. x 50 mm. x 3 mm. (JIS, ST–40) was used as a layer plate. The welding surface was deoiled with benzene. The layer metal was placed on the base metal, after making a depressed portion of 20 mm. in width and 0.3–0.4 mm. in depth by means of a grinder (#36) at the longitudinal center of the surface to be welded, and then placed on a concrete base of 200 mm. in thickness.

An explosive of 500 mm. in length having the same composition as in Example 1, of 12 mm. in height, 14 mm. in width and an angle of 120° at the bottom, and formed as a cord with a recess height $h$ of 3.5 mm. as shown in $b$ of FIGURE 5, was set up on the layer metal. As the result of detonating from one end with a No. 6 electric detonator, the metallic plates were completely welded. Weldings were repeated ten times under the same condition, all cases being successful. The result of stripping testing of a total of fifty samples of welded material in ten equal parts, the average stripping strength (stripping load on unit length percent of the side of the welded portion) was found to be 38.6 kg./mm.

On the other hand, as a result of the weldings tried fifteen times at the same dimension and same material but with no depressed portion the average stripping strength for seventy five stripping test samples was found to be 9.3 kg./mm.

*Example 7*

|  | Weight percent |
|---|---|
| Paraffin wax | 12 |
| Ester gum | 3 |
| Petrolatum grease | 10 |
| Pine tar | 5 |
| PETN | 70 |

The above-mentioned raw materials of the plasticizer were melted and mixed at 95° C. The mixture was cooled to 65° C., and added to PETN and an explosive composition was produced by means of a kneading machine. The original explosive was processed to form explosive cord having a square section of 7 mm. x 7 mm. This explosive cord has a detonating speed of 7,200 m./sec. and could satisfactorily weld a stainless steel plate (JIS, SUS–27) of 1 mm. in thickness onto a soft steel plate (JIS, SS–41) of 9 mm. in thickness.

*Example 8*

|  | Weight percent |
|---|---|
| Paraffin | 12 |
| Rosin | 3 |
| Petrolatum grease | 15 |
| Hexogen | 70 |

An explosive having the above-mentioned constituents was processed by the same method as mentioned in Example 7 to make an explosive cord having a square section of 7 mm. x 7 mm., which had a detonating velocity of 6050 m./sec. and which could weld the same metallic plate together as mentioned in Example 1.

*Example 9*

|  | Weight percent |
|---|---|
| Paraffin | 20 |
| Rosin | 2 |
| Ester gum | 3 |
| Petrolatum grease | 14 |
| PETN | 60 |

An explosive cord having above-mentioned composition and a cross section of 3 mm. x 4 mm. and a detonating velocity of 6450 m./sec. could weld two stainless steel plates of 0.5 mm. in thickness (JIS, SUS–27) each other.

*Example 10*

|  | Weight percent |
|---|---|
| Paraffin | 17 |
| Petrolatum grease | 14 |
| Ester gum | 9 |
| Tetryl | 60 |

An explosive cord having the above-mentioned composition and a cross section of 7 mm. x 8 mm. and a detonating velocity of 6180 m./sec. could weld the same metallic plates as mentioned in Example 1.

*Example 11*

|  | Weight percent |
|---|---|
| Paraffin | 10.5 |
| Ester gum | 7.0 |
| Petrolatum grease | 17.5 |
| Potassium nitrate | 15.0 |
| PETN | 50.0 |

The strength determined by a ballistic motar test on an explosive cord containing the above-mentioned composition was 49% of that of the explosive described in Example 1 and with the detonating velocity of the explosive cord having a cross section of 7 mm. x 8 mm. was 5490 m./sec. This could completely weld an aluminium plate of 1 mm. in thickness (JIS, ALP3-0) on a soft steel plate of 9 mm. in thickness.

Table 1 shows the results of examples using an explosive consisting of 17% of paraffin wax, 16% of petrolatum grease, 7% of ester gum and 60% of PETN, by varying the explosive shapes, quantity of explosive, covering method, covering material and the kind of metals to be welded. Surface treatment was performed with a grinder (#100) for base plates and with an emery paper (E120) for layer plates. Symbols in the column headed: Shape of bottom in the table, show figures which correspond to the same figures shown in the drawings as indicated in FIGURE 5. Symbols under the heading Cover Method in column 10 show the figures corresponding to those in drawings.

thickness of a plurality of layer metals up to 4 mm. can also be welded.

The explosive welding method of the present invention differs from conventional welding methods in that the welding material can be exposed to heat for a long period of time and caused very little change or distortion in the structure and retain considerably high welded strength after welding. It is suitable for example for lining an item which requires corrosion-proofing properties. It also requires no special apparatus for carrying it out as required in many conventional welding methods. An electric power source is enough to detonate a detonator.

It also requires no special skill of the operator and welding can be carried out with a small quantity of explosive, thus enabling the safe performance of the work indoors or in a limited space.

Furthermore, the kinds of metals suitable to the ex-

TABLE 1

| Example | Shape of Bottom | Shape of explosive | | | | | | Quantity of explosive (g./m.) | Cover | | | |
|---|---|---|---|---|---|---|---|---|---|---|---|---|
| | | H+h (mm.) | h (mm.) | r (mm.) | θ (degree) | d (mm.) | D (mm.) | | Method | Material | Rubber hardness (JIS) | Maximum thickness of bottom (mm.) |
| 12 | Plane | 3 | | | | | 4 | 11 | 8 | Vinyl nitril rubber | 60 | 2 |
| 13 | do | 3 | | | | | 4 | 11 | 8 | Natural rubber | 35 | 1 |
| 14 | 5-b | 7 | 2.3 | | 120 | 8 | 8 | 53 | 6-b | do | 70 | 2 |
| 15 | 5-b | 7 | 2.3 | | 120 | 8 | 8 | 53 | 7-b | do | 70 | 4.3 |
| 16 | 5-a | 12 | 2.6 | 10.6 | | 14 | 14 | 120 | 7-a | Vinyl nitril rubber | 63 | 3.6 |
| 17 | 5-b | 12 | 2.5 | | 140 | 14 | 14 | 149 | 7-b | do | 63 | 3.5 |
| 18 | 5-a | 12 | 2.8 | 5.8 | | 10 | 14 | 138 | 6-a | do | 71 | 1.6 |
| 19 | 5-a | 12 | 2.8 | 5.8 | | 10 | 14 | 138 | 7-a | do | 71 | 3.8 |

| Example | Base Plate | | Layer Plate | | Indentation | | Appearance | Stripping strength (Kg./mm.) |
|---|---|---|---|---|---|---|---|---|
| | Kind | Plate thickness (mm.) | Kind | Plate thickness (mm.) | Max. depth (mm.) | Width (mm.) | | |
| 12 | Soft steel | 9 | Stainless steel SUS 27 | 0.51 | 0.31 | 4.2 | Good | Broken. |
| 13 | do | 9 | do | 0.5 | 0.35 | 4.3 | Damaged | Do. |
| 14 | do | 9 | do | 1 | 0.53 | 8.2 | Good | Do. |
| 15 | do | 9 | do | 1 | 0.32 | 8.2 | Better | Do. |
| 16 | do | 12 | Titanium ST-60 | 2 | 0.82 | 15.0 | do | 48.1. |
| 17 | do | 12 | do | 2 | 1.10 | 14.7 | do | 50.2. |
| 18 | do | 12 | Copper Cu P2-0 | 3 | 1.21 | 12.0 | Poor | 25.2. |
| 19 | do | 12 | do | 3 | 0.97 | 12.2 | Better | 30.3. |

Example 20

A soft steel plate (JIS, SS-41) of 9 mm. in thickness having a cylindrical surface of 300 mm. diameter as a base plate and an aluminium cylinder of 1.5 mm. in thickness and 300 mm. of diameter as the layer plate were overlapped on their whole surfaces and set on the ground. The surface to be welded was cleansed with a grinder (#100) for the steel plate and with emery paper (E120) for the aluminium plate.

An explosive of the same composition as described in Example 1 was set up along the circumference of the layer plate in the form of an explosive cord of 50 mm. in length and was connected to a detonation point. A stainless steel plate of 20 mm. x 20 mm. x 0.3 mm. (JIS. SUS-27) coated with spindle oil on one side as a welding preventing agent was inserted between the layer plate and the explosive, preferably at the position of impact facing the detonating position. The above-mentioned explosive cord was detontaed with a No. 6 electric detonator. The aluminium plate was welded to the soft steel plate at its circumference without the formation of impact marks of the detonation front.

As mentioned above, it is not necessary to provide a gap between the layer and base plates to maintain an angle. They can be welded in simple form such as in a linear, curved or broken form or a combination of these forms as required by simply overlapping them. The thicknesses of the plate employed as a layer plate capable of being welded ranges from 0.3 mm. to 4 mm., and the total plosive welding applications of this invention are unit metals or alloys of steel, iron, copper, tin, aluminium, chrome, nickel, cobalt, niobium, magnesium, beryllium, molybdenum, tungsten, zirconium, titanium, vanadium, tantalum, silver, gold, platinum or similar metals and various combinations of those metals, which are welded with difficult conventional methods.

Having thus described the invention, what is claimed and desired to be secured by Letters Patent is:

1. A method of line welding metal plates by explosion comprising overlapping at least two metal plates having contacting surfaces which are clean at least at the welding location, forming an explosive cord having a surface with a recess therein having a maximum depth which is less than one-half the height of said cord, and a width which is greater than one-half the maximum width of the cord, positioning said surface of the cord with the recess on an exposed surface of one of the plates, and detonating the explosive cord to weld the plates along their contacting surface in the immediate vicinity of the explosion, the recess in the cord producing concentration of the force of the explosion inwardly toward a central longitudinal axis of the cord.

2. A method as claimed in claim 1 comprising forming a depression 0.1 to 1 mm. deep in the plate furthest from said cord in the surface thereof which is in contact with the next plate, said depression being coextensive with the cord.

3. A method as claimed in claim 2, wherein said depression has a width between one and two times that of the cord.

4. A method as claimed in claim 1, wherein said explosive cord is endless, the method further comprising interposing a metallic leaf between said one plate and the explosive cord at the position at which shock interference from the detonation front of the explosion is effected.

5. A method as claimed in claim 4, comprising interpositioning an intermediator between the metallic leaf and said one plate.

6. A method as claimed in claim 5 wherein the intermediator is selected from the group consisting of mineral oil, vegetable oil, paper and synthetic resin.

7. A method as claimed in claim 1 comprising covering said cord with a thin flexible layer conforming to the shape of the recess.

8. A method as claimed in claim 1 comprising forming lateral extensions on the flexible layer for resting on said exposed surface.

9. A method as claimed in claim 8 comprising applying adhesive material to said lateral extensions to enable securing said extensions and thereby the layer and cord to said exposed surface.

10. A method as claimed in claim 1, wherein said recess is formed arcuately.

11. A method as claimed in claim 1, wherein said recess is formed in V-shape.

No references cited.

JOHN F. CAMPBELL, *Primary Examiner.*

PAUL M. COHEN, *Assistant Examiner.*